Nov. 5, 1940.        P. DRAGON        2,220,320
APPARATUS FOR SHELLING NUTS
Filed July 27, 1938        4 Sheets-Sheet 1

INVENTOR.
PAUL DRAGON
BY George B. White
ATTORNEY.

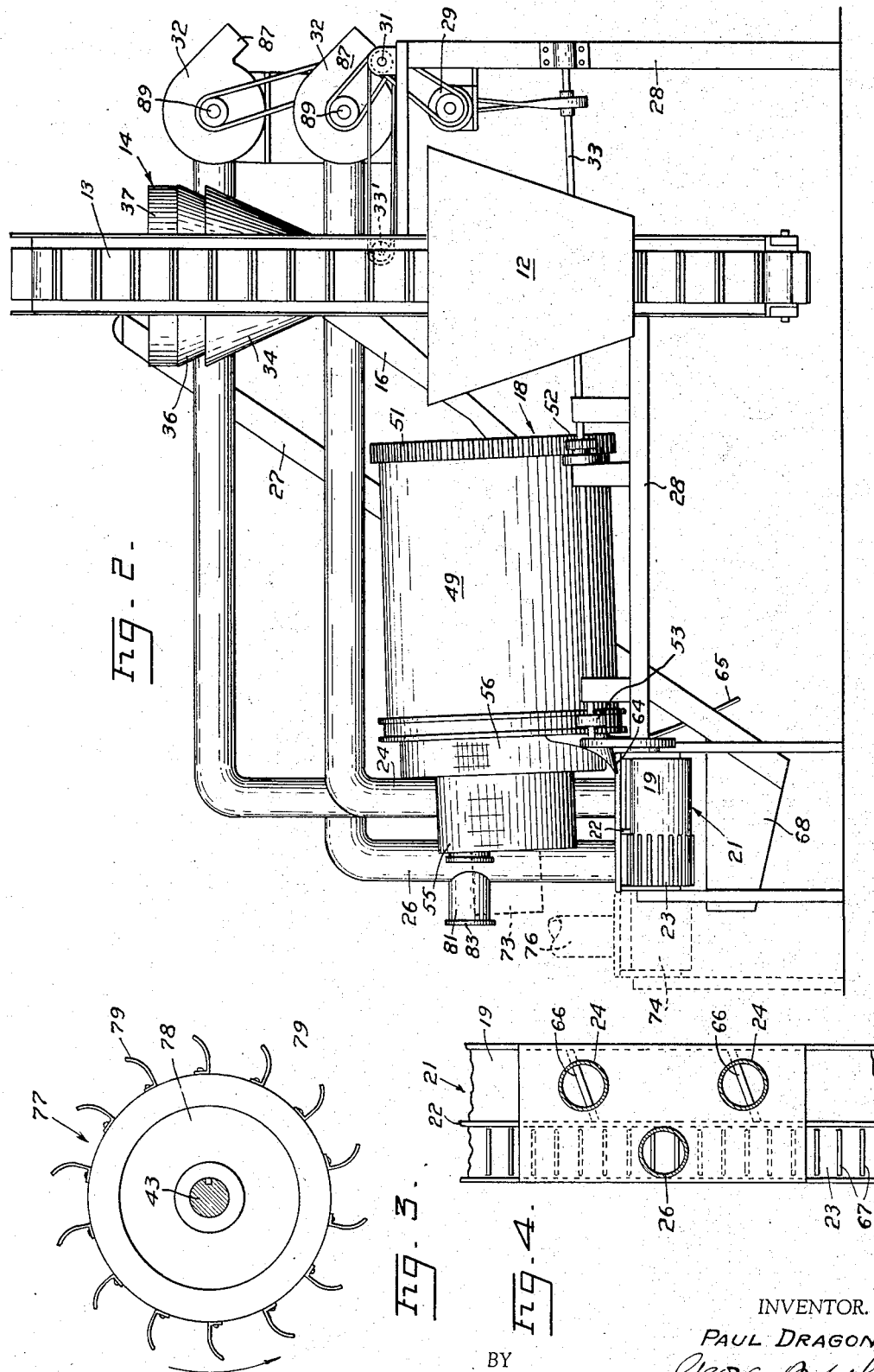

Nov. 5, 1940.   P. DRAGON   2,220,320
APPARATUS FOR SHELLING NUTS
Filed July 27, 1938   4 Sheets-Sheet 3
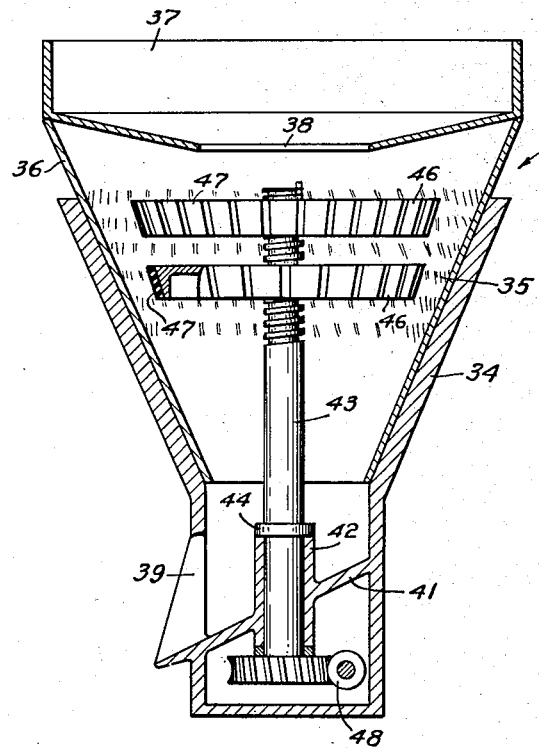
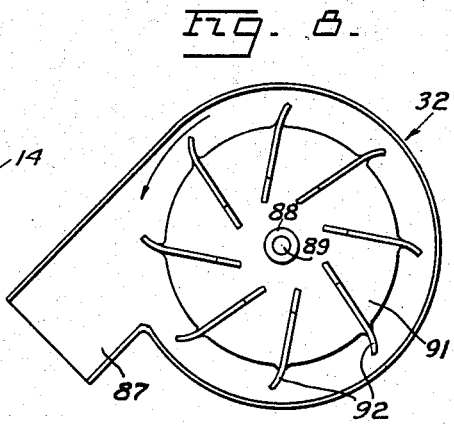
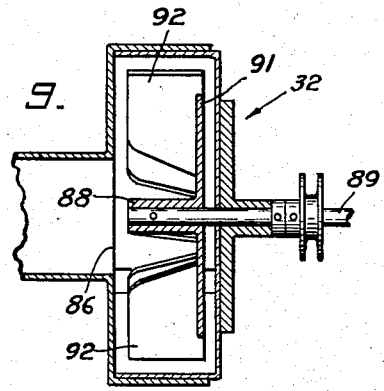
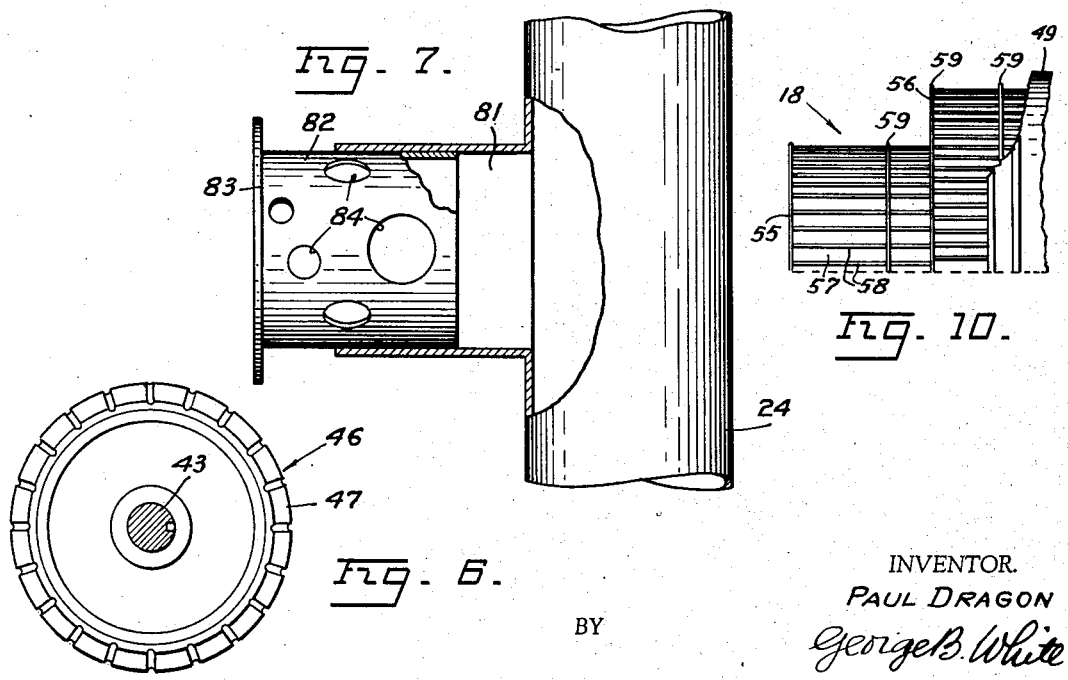
INVENTOR.
PAUL DRAGON
BY George B. White
ATTORNEY.

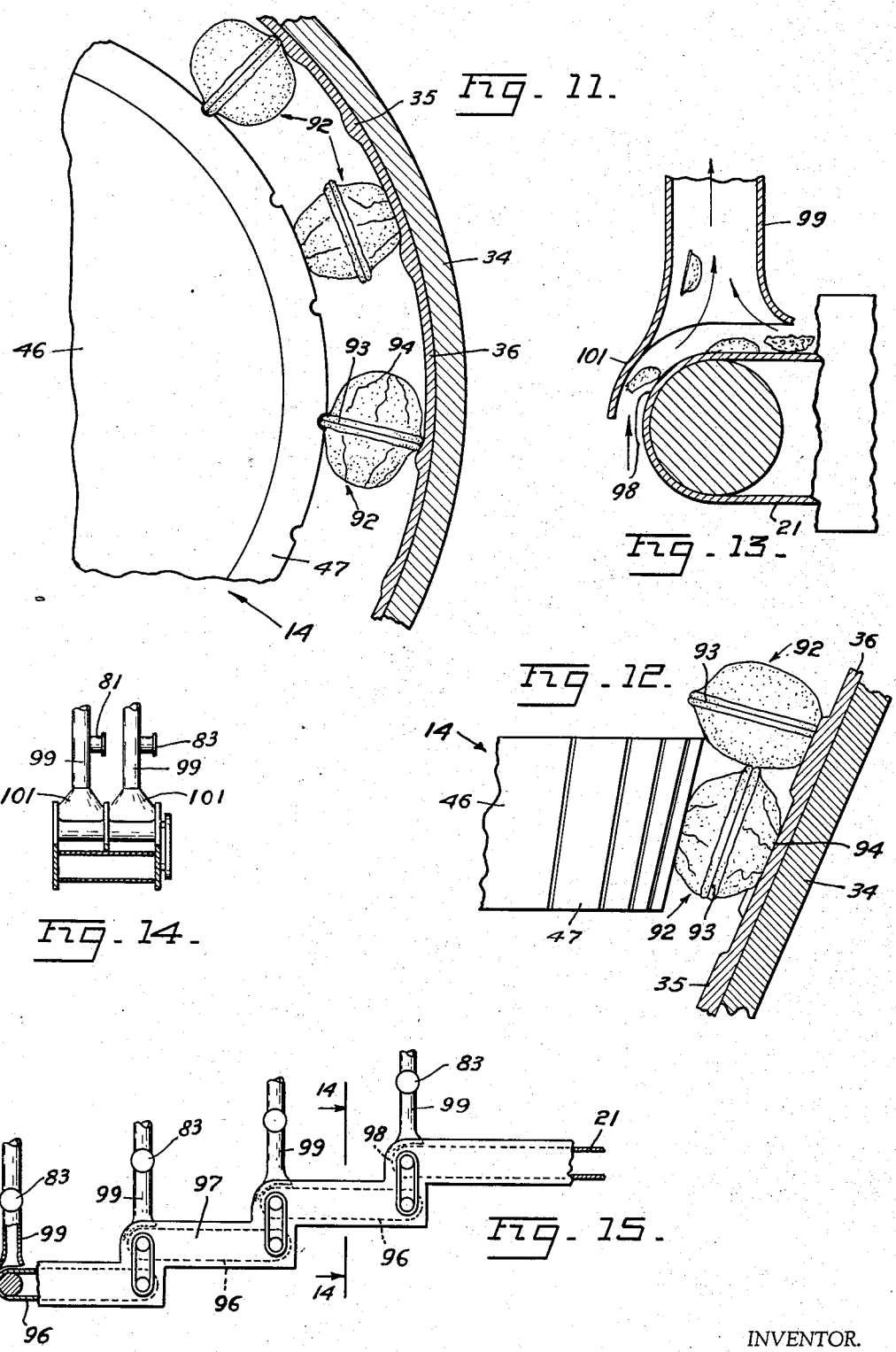

Patented Nov. 5, 1940

2,220,320

UNITED STATES PATENT OFFICE 2,220,320

APPARATUS FOR SHELLING NUTS

Paul Dragon, San Francisco, Calif.

Application July 27, 1938, Serial No. 221,532

2 Claims. (Cl. 146—11)

This invention relates to a device for shelling nuts.

An object of this invention is to provide an apparatus whereby nuts can be completely freed from the shells without any injury to the meat of the nut; said apparatus includes means whereby the cracked nuts are automatically separated and sorted and the nuts partly shelled are returned for repeated shelling automatically; particularly my apparatus includes means for cracking the nuts preferably by rolling pressure, then separating the cracked meat of the nuts and shells according to the absence or presence of meat in the cracked shells and passing them in separated paths subjecting the nuts on said paths to suction sufficient to lift the loose empty shells but not strong enough to lift the meat of the nut, and automatically returning the shells still containing meat for repeated cracking and shelling.

Another object of this invention is to provide an apparatus for cracking and shelling nuts wherein the nuts can be efficiently cracked and shelled, means being provided for automatically separating the meat from the partly cracked nuts and from the shell, means being provided for removing the loose shell during the travel of the products of the cracker, and means being provided for returning the shells containing meat to the same or to an auxiliary shelling device for repeated treatments.

Another object of this invention is to provide a device for shelling nuts which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description and specifically pointed out in the appended claims, reference is had to the accompanying drawings for the illustrative embodiment of the invention, wherein:

Fig. 2 is a side view of my machine.

Fig. 3 is a detail view of a rotor for hulling nuts.

Fig. 4 is a fragmental view of the conveyor showing the suction conduits in section.

Fig. 5 is a sectional view of the cracker mechanism in my apparatus.

Fig. 6 is a plan view of the rotary drum in my cracking mechanism.

Fig. 7 is a fragmental, sectional view of the suction adjuster of my device.

Fig. 8 is a side view of a blower for my suction device, the cover being removed.

Fig. 9 is a cross sectional view of said blower.

Fig. 10 is a fragmental side view, showing the preferred construction of the separator of my device.

Fig. 11 is a fragmental partly sectional plan view of my cracking mechanism.

Fig. 12 is a fragmental partly sectional plan view of my cracking mechanism.

Fig. 13 is a fragmental, sectional view of the suction conduit at an end of a nut carrying conveyor.

Fig. 14 is a sectional view of the conveyor taken on the line 14—14 of Fig. 15.

Fig. 15 is a fragmental, somewhat diagrammatic view of a stepped conveyor and suction means.

Figure 1:
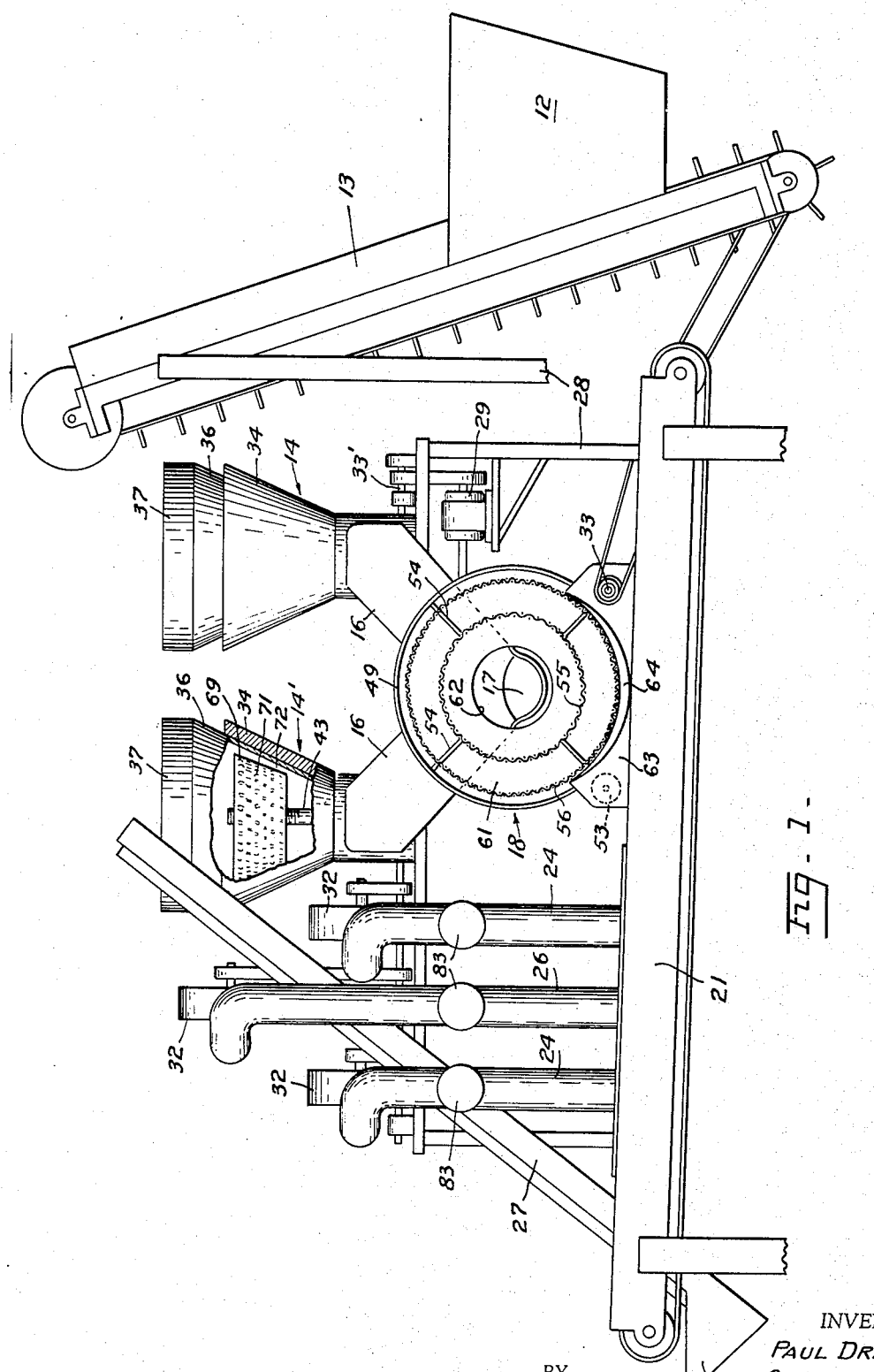
Fig. 1 is a front view of my machine.

In my apparatus the nuts are subjected first to a force to sever the shells. Preferably, the force applied that of rolling pressure. In the present illustrative embodiment the nuts are subjected to yieldable rolling pressure for cracking the shells. The products of said cracking step are then separated so that the meat of the nuts and the portions of the shells still containing meat are moving on separate paths and are subjected to regulated suction for removing only the empty shells from said meat or partly cleaned shells. The products passing said sucking action may be suitably loosened to facilitate the removal of the empty shells. Then the meat of the nuts is collected but the pieces of shells still containing meat are automatically returned for repeated cracking and shelling and then reintroduced to said paths. The second rolling pressure to which said pieces of shells containing meats are subjected is preferably stiffer than the first rolling pressure. The apparatus for cracking the pieces or broken portions of nuts involves the applying of rolling pressure in a gradually diminishing space so as to crack the pieces of partly filled shells of all forms and sizes.

In carrying out my invention I make use of a hopper 12 from which the nuts are carried by a suitable conveyor, such as a bucket conveyor 13, and dumped into a cracking mechanism 14. Adjacent to this cracking mechanism 14 is located a second cracking mechanism 14' both discharging the cracked and shelled nuts through discharge conduits 16 to an outlet 17 common to both, which latter feeds into the center of a screen sifter or rotary separator 18. The separator 18 is adapted to grade the products of cracking and it separately discharges the meat of the nuts onto the side 19 of a conveyor 21 between a fixed partition 22 and the separator 18. The pieces of shells still containing meat are discharged from the separator 18 onto the other side 23 of the conveyor 21. The meat of the nut is passed beneath a pair of suction conduits 24 which suck the lighter empty shell pieces that may be mixed with the meat of the nuts so that the meat of the nuts can be collected at the end of the conveyor 21 clean from all loose shell. The pieces of shells containing meat are also carried past another suction conduit 26 whereby the loose and empty shells are lifted off the outer conveyor side 23. The shell pieces on the outer conveyor side 23 that still contain meat are dumped from the conveyor onto another bucket conveyor 27 which carries the partly cleaned pieces of shells into the first cracker mechanism 14 if only one unit is used, or into the second cracker unit 14' from which latter the recracked nut is reintroduced into the separator 18 as heretofore described.

In detail my apparatus includes a frame 28 so arranged that the conveyor 21 is supported below the separator 18, and the cracking mechanisms 14 and 14' are supported above the level of the separator 18. Behind the separator 18 on the frame 28 is located an electric motor 29 which through a drive shaft 31 and through suitable transmissions transmits rotation to blowers 32 which latter are connected respectively to the suction conduits 24 and 26. The motor 29 is also suitably connected to another drive shaft 33' from which rotation is suitable transmitted to the cracking mechanisms 14 and 14'. The conveyor 21 and the bucket conveyors 13 and 27 are also driven by suitable transmissions taking the power from a shaft 33 from which latter rotation is also transmitted to the separator 18.

The first cracking mechanism 14 as shown in Fig. 5 includes a hollow casing 34 which has a downwardly converging frusto conical upper portion open at its top. Into this casing 34 fits a removable frusto-conical hollow lining 36 the inner periphery of which is roughened by protuberances 35. The lining 36 has a hopper 37 formed in its top with a central intake opening 38 into the interior of the lining 36. The lower portion of the casing 34 has a side outlet opening 39 and is divided transversely by a partition wall 41 which latter inclines downwardly toward the lower edge of the outlet opening 39 so as to direct the products falling down from the lining 36 toward said outlet opening 39. On this partition wall 41 is a vertical journal 42. A vertical shaft 43 is supported in the journal 42 by means of its collar 44 resting on the top of the journal 42. The upper end of the shaft 43 is threaded. A pair of spaced drums 46 are threadedly secured to the shaft 43 and suitably held in an adjusted position, such as by a removable key. Each drum 46 is comparatively narrow and is provided with yieldable or resiliently compressible pressure surfaces in the form of spaced cushions 47 either inserted into the drum periphery or formed on a ring pressed on the drum periphery. It is preferable that these pressure cushions 47 have arcuate outer periphery to apply rolling pressure on nuts between the lining 36 and the respective drums 46. Rubber composition cushions with hard wearing surface and vulcanized to the drums 46 were found efficient for this purpose. The drums 46 are readily replaceable and are adjustable relatively to the lining 36 by removing the fastening key and then turning the drums 46 on the threaded portion of the vertical shaft 43 so as to adjust downwardly if the narrowing of the cracking space is desired, or to adjust upwardly if a widening or enlargement of the cracking space is desired, according to the size or form of nuts to be shelled. In all adjustments the conical outer surface of the drums 46 converges with the inner periphery of the lining 36 and defines a downwardly diminishing pressure space. The rotation of the drums 46 is effected by rotating the vertical shaft 43 by means of a suitable worm and gear transmission 48 located in the space below the partition wall 41 in the casing 34. The shaft 43 receives power by any suitable means from the outside as heretofore stated.

The rotary sifter or separator 18 includes an outer drum 49 which is preferably cylindrical. An external gear ring 51 on the drum 49 is engaged by a gear 52 on the drive shaft 33 for rotating the separator drum 49. The separator drum 49 is supported on rollers or idlers 53 in a downwardly inclined position toward the conveyor 21. On radial arms or spokes 54 inside of the drum 49 are held concentric sifter or separator drums 55 and 56. Both of the sifter drums 55 and 56 are preferably constructed, as shown in Fig. 10, so as to have elongated perforations or apertures 57 through the walls thereof. In the herein illustrative embodiment a plurality of longitudinal wires or bars 58 are held in circumferentially spaced relation to form a skeleton cylinder by means of spaced loops or rings 59. The spaces or apertures 57 in the inner drum 55 are larger than the apertures of the outer drum 56. The object of the relative sizes of the apertures 57 is to permit shelled half nuts and smaller pieces to work through the wall of the inner drum 55 and drop into the outer sifter drum 56, but to retain the partly shelled or whole nuts in the center inner drum 55. On the other hand the outer sifter drum 56 permits the sifting through only the very small particles. The higher end of the outermost drum 49 is closed by an end plate 61 which has a central aperture 62 into which the outlet 17 empties. Thus the cracked or shelled nuts, in fact the entire product of both cracking mechanisms 14 and 14', are discharged into the inner sifter drum 55 and as the product moves toward the lower ends of the drums of the separator 18 it is carried around the drums and works its way so that all the loose meat of the nuts works through the apertures 57 of the innermost drum 55 and into the outer sifter drum 56. It is to be noted that the inner sifter drum 55 extends beyond the end of the outer sifter drum 56 and over the outer conveyor side 23, while the inner sifter drum 56 extends over the inner conveyor side 19. A front shield 63 on the end of the outermost drum 49 covers the space between the outer sifter drum 56 and the outermost drum 49 to prevent the dust that may be gathered in the bottom of the separator 18 from being dumped onto the conveyor 21. This shield 63 has a lip 64 which extends over the inner conveyor side 19 so as to guide the meat of the nut well over the conveyor side 19. Behind the shield 63 is a small space and the shield 63 has an extension 65 to guide the dust or small particles from the drum 49 away from the conveyor 21 and well below the frames 28. If so desired this dust may be collected in a suitable container not shown.

The conveyor 21 is the usual endless conveyor and the two paths thereon are formed by the stationary partition strip 22 fixed on the frame of the device. In order to facilitate the lifting of empty shells from the inner path of the conveyor 21, a transverse, flat bar 66 is provided across the conveyor below each suction conduit 24. The scraper bars 66 are preferably slightly inclined toward the direction of the approaching nuts so as to cause the meat to ride over said flat bars 66 below the respective suction conduits 24 thereby to loosen the empty shells and facilitate the lifting thereof by suction. The cleaned meat of the nuts can be collected at the end of the conveyor side 19 in any suitable container or receiver not shown. The outer side 23 of the conveyor 21 receives the partly cleaned or broken shells still containing meat, or larger pieces of shells, from the inner sifter drum 55 of the separator 18. There are cross bars 67 on this outer conveyor side 23 between which the broken pieces are loosely carried and are cleaned of empty shells by the suction conduit 26.

The shells still containing meat are dumped at the end of the outer conveyor side 23 into another hopper 68 which latter feeds into the second bucket conveyor 27 whereby the product is fed into the second cracking mechanism 14. The second cracking mechanism 14' is of the same construction as that of the first cracking mechanism 14 except that it is preferable to have the rolling pressure elements less yieldable. The stiffer rolling pressure elements can break up the shells that were not broken and cleaned in the first mechanism 14. For this purpose in this illustrative embodiment a larger pressure cone 69 is shown in Fig. 1. This cone 69 is wider than the aforedescribed yieldable drums 46 and is stiffer. A plurality of alternating sharp and dull projections 71 extend from the pressure cone 69. The pressure space 72 is comparatively narrow and it gradually diminishes toward the bottom to break up even smaller pieces of shells that still contain meat. The pressure cone 69 is adjustable and removable in the manner described in connection with the pressure drums 46 of the first cracking mechanism 14.

It is to be noted that the same device may be used for hulling and shelling. For instance for hulling almonds and also shelling the same in the same operation, a third sifter drum 73 may be provided as indicated in broken lines in Fig. 2. This sifter drum 73 is inside of the inner drum 55 and has apertures large enough to permit whole hulled nuts to fall through into the inner drum 55. The remaining hulls are discharged at the end of the hulling drum 73 preferably to an added branch conveyor 74 and sucked up by an additional suction tube 76 as also indicated in broken lines in Fig. 2. When used for hulling the first cracking mechanism 14 is provided with a huller rotor 77, shown in Fig. 3, in place of the pressure drums 46. The huller rotor 77 includes a hub 78 which is secured on the threaded portion of the vertical shaft 43. Substantially radial fingers 79 extend from the hub 78 of the rotor 77 toward the periphery of the lining 36. The fingers 79 are curved on their outside end toward the direction of rotation of the rotor 77 so as to roll, press and claw the hulls of the nuts travelling down the incline of the lining 36. The fingers 79 are resilient. When such huller rotor is utilized in the first cracking mechanism 14 of the apparatus then the second cracking mechanism 14' is provided with the rolling pressure drums 46 so that the hulled almonds that are returned to the latter by the second bucket conveyor 27 are properly cracked and shelled and then returned into the separator 18, and there the meat is sifted to be discharged to the inner side 19 of the conveyor 21 as heretofore described.

All the suction devices being of substantially the same structure the description of one will suffice. The suction tube, such as the conduit 24, is curved rearwardly of the apparatus and is connected to the inlet of the blower 32. In order to regulate the force of the left at the intake end of the suction tube a regulator is provided, as particularly shown in Fig. 7. This regulator consists of a side air inlet 81 into which slidably fits a cylindrical valve 82 which latter in turn is open at its inner end and is closed by a plate 83 at its outer end. On the side of said cylindrical valve 82 are a plurality of holes 84 which are smaller nearer the plate 83 and larger toward the inner end of the valve 82. By pulling the valve 82 outwardly, more air is sucked in at the side inlet 81 and vice versa, and the suction force at the bottom or intake end of the tube or conduit 24 is correspondingly varied. Thus the suction can be adjusted to fit the types of nuts and shells hulled or shelled in the apparatus so as to assure complete and efficient separation of the empty shells from the product.

Efficient separation of the shells is further enhanced by the use of the blower structure illustrated in Figures 8 and 9. In this blower 32 the casing has a central inlet 86 and a substantially tangential outlet 87 which latter may discharge the shells into any suitable receptacle or conveyor not shown. The rotor of the blower has a hub 88 fixed on a shaft 89 which latter is journalled in the casing of the blower opposite the inlet 86. From the hub 88 extends a baffle or disc 91 alongside and parallel with the back wall of the blower 32. From the face of the disc 91 in turn extend forwardly and toward the inlet 86 a plurality of impeller blades 92. These blades 92 are not truly radial to the axis of rotation but are tangential thereto so as to incline away from the direction of the impeller rotation thereby to facilitate the sliding off of the shells into the tangential outlet 87. The blades 92 do not extend to the conical hub 88 but leave a circular space opposite the inlet 86 for receiving the shells. The empty shells are thus sucked against the center of the disc 91 and are from there slid off at great speed along the tangential blades 92 and out through the outlet 87. This form of blower was found to be the most efficient for continued operation with uniformly good result in lifting all the empty shells from the product.

My apparatus for cracking and shelling nuts by rolling pressure is illustrated in more detail on Figures 11 and 12 especially in connection with walnuts. Each walnut 92 has a ridge 93, at which its halfshells join. Transversely a walnut 92 is usually wider at the diameter connecting the bottoms of its cups or halfshells than the transverse or shorter ridge diameter. In other words the bottoms 94 of the halfshells of a walnut 92 are spaced apart farther than the transverse diameter of the ridge 93. The ridge 93 usually protrudes slightly from the surface of the walnut 92 and is of double thickness. Consequently usually the weakest portions of a walnut 92 are the portions of the halfshells outside of the ridge 93.

The gradually tapering space between the drum cushions 47 and lining 36 of the cracker mechanism 14 urges the walnuts 92 to assume such a position that the walnut is rolled substantially around its longitudinal axis. The ridge 93 resists cracking longer than the more protuberant and weaker bottoms and sides of the halfshells of the walnut 92, with the result that the weaker shell bottoms are cracked in the higher and wider spaces of the cracking mechanism 14, and the ridges 93 are cracked thereafter. In this manner relatively more so-called halves of walnut are produced than heretofore produced by other cracking means. The splitting of the nuts so as to produce walnut meat in perfect halves without waste is automatically accomplished by the application of rolling pressure in a gradually diminishing squeezing or cracking space so as to roll the walnut around its longitudinal diameter as an axis under constant, increasing transverse pressure.

In order to still further facilitate the removal of empty shells from the nut carrying conveyor by means of suction, the conveyor may be made in steps or sections, as shown in Figure 15. The conveyor 21 in this form is divided into two paths as heretofore described but it is shortened. A plurality of short endless conveyors 96 are arranged in downwardly stepped relation on a frame 97, so that the discharge ends 98 of each higher conveyor 96 overlaps the intake end 99 of the next lower conveyor 96. All the conveyors 96 are divided by the central partition wall 22 so as to produce parallel downwardly stepped paths for the meat and partly cleaned shells as heretofore described. A pair of suction conduits 99 is provided above the discharge end 98 of each conveyor. Each conduit 99 has a suction head 101 which fits over the curvature of the discharge end 98 of the respective conveyor. The suction conduits 99 operate in the manner heretofore described in connection with the conduits 24 and 26, except that a portion of the suction head 101 surrounds the curvature of the end 98 of the conveyor so as to lift by suction certain empty pieces of shells as they topple over and loosen at the discharge ends 98 of the conveyors. By this arrangement complete removal of all empty shells from both paths of the conveyors is achieved.

I claim:

1. The combination with a nut shelling mechanism, a second nut shelling mechanism being adapted to crack and shell smaller nuts and pieces of shells still containing meat, means to separate from the products of said nut shelling mechanisms the pieces of shells still containing meat, of means to automatically return said pieces of shells still containing meat to the said second nut shelling mechanism, and means to remove empty shells mixed with said meat or with said shells still containing meat, said last means including a plurality of endless conveyors arranged in overlapping stepped series, and a suction conduit having its intake superimposed on the turn at the discharge end of each conveyor so as to act upon said shells when the shells are loosened by the turns of said conveyors.

2. In combination a nut shelling mechanism, a second nut shelling mechanism being adapted to crack and shell smaller nuts and pieces of shells still containing meat, a rotary drum to separate from the products of said nut shelling mechanisms the pieces of shells still containing meat and to discharge the separated products at different points, means to carry on separate paths the separately discharged products, means to automatically return said pieces of shells still containing meat from one separate path to the said second nut shelling mechanism, and suction means located between the separating means and said returning means to remove the empty shells mixed with said meat or with said pieces of shells still containing meat.

PAUL DRAGON.